Oct. 12, 1965  J. P. SHEAHAN  3,211,597
METHOD OF ROOF CONSTRUCTION
Filed June 26, 1961
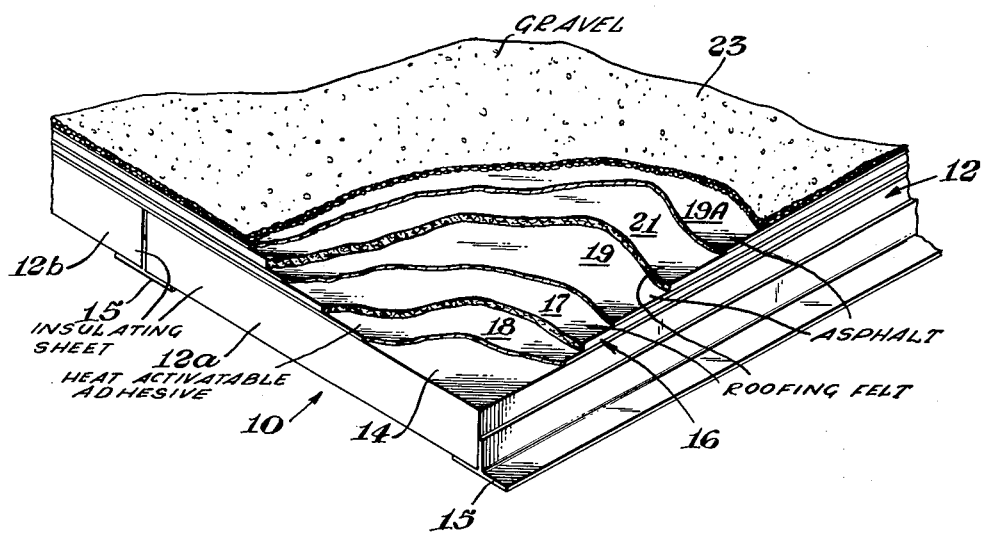
INVENTOR.
James P. Sheahan
BY
AGENT

United States Patent Office 3,211,597
Patented Oct. 12, 1965

3,211,597
METHOD OF ROOF CONSTRUCTION
James P. Sheahan, Midland, Mich., assignor to The Dow Chemical Company, Midland, Mich., a corporation of Delaware
Filed June 26, 1961, Ser. No. 119,613
7 Claims. (Cl. 156—71)

This invention relates to a method of installing roofs. It more particularly relates to a method for the fabrication of a built up roof structure.

In fabrication of roofs, particularly those of the commercial and industrial variety known as built up roofs where an essential element of the roof structure is a plurality of layers of roofing felt or similar fiberous material bonded together with asphalt or other heat plastifiable or liquifiable bituminous or plastic material, it is desirable to incorporate integrally into the roof structure an insulation member. A variety of methods are employed to incorporate a sheet of insulation material, such as foamed plastics, into a roof structure. Typically, cellular glass, cellular plastic, or fibrous plank, boards or sheets are positioned over a suitable supporting structure, a layer of adhesive material is applied to the upper surface of the foamed insulation and subsequently a plurality of layers of roofing felt are applied. The layers of felt are bonded together and to the insulation board by an asphalt composition which is applied in a hot molten condition. On cooling of the asphalt in a practical installation there are usually spaces between the insulating members which are not readily filled by the adhesive when the first layer of felt or similar covering is applied to the adhesive treated insulation layer. Generally a moisture path exists from the interior of the building on the bottom of the roof into the first or initial layer of felt. Usually, due to the normal temperature differences, particularly in cool weather, moisture will accumulate in the first layer of felt, giving rise to blistering and ultimate failure of the roof.

Much difficulty is encountered in applying conventional adhesives to foamed plastic insulation boards, particularly those made of expanded polystyrene. Conventional roofing asphalts are often heated to a temperature in excess of the heat distortion temperature of the base sheet. Application of such a hot composition to a thermoplastic insulating board frequently results in severe deformation or distortion. Limited success has been obtained by judicious temperature control of the asphalt, but field conditions do not permit sufficiently precise temperature control of the asphalt that acceptable operation can be assured. Oftentimes solvents are employed in an attempt to reduce the required temperature, but these frequently have the disadvantage of attacking the base material and requiring an excessive length of time to dry or evaporate from the adhesive. Solvents also represent an undesired and additional expense.

It is an object of this invention to provide a method of fabricating a built up roof employing a plurality of layers of felt and a rigid thermal insulating bond overlaying said felt layers which provides improved moisture resistance.

Another object of this invention is to provide a method of fabricating a built up roof having integral insulating material requiring less installation effort.

A further object of this invention is to provide a method of fabricating a built up roof which does not require close control of the temperature of roofing asphalt when applied directly to a foam plastic insulating member.

An additional object of this invention is to provide a lower cost roofing component having superior physical properties.

These objects and other advantages are achieved in accordance with the invention by fabricating a roof structure by means of the steps comprising: providing in a roof structure a sheet, applying over said sheet a flexible web having on one surface a heat activatable adhesive, applying said adhesive surface to said insulating sheet, placing on the side of said web opposite to said heat activated adhesive a hot fluid adhesive composition having a sufficient quantity of heat to raise the temperature of said web and said heat activatable adhesive to a sufficient temperature to adhere said heat activatable adhesive to said insulating sheet.

Further features and advantages of the invention will become more apparent in the following description and specification in connection with the accompanying drawing wherein:

In the figure there is illustrated a portion of a roof structure in accordance with the invention generally designated by the reference numeral 10. A portion of the roof structure 10 comprises an insulating sheet 12 having a top surface 14. The insulating sheet is comprised of two coplanar portions 12a and 12b carried by support members 15. Overlying the top surface 14 of the base sheet 12 is a base felt layer generally indicated by the reference numeral 16. The base felt layer 16 comprises a layer of roofing felt 17 and adhered thereto a layer of heat activatable adhesive 18. On top of the layer 16 is a mopped layer of hot asphalt 19. Overlying and adhering to the asphalt layer 19 is a layer of roofing felt 21. Above the roofing felt 21 is a second asphalt layer 19a in which there is embedded a gravel layer 23.

In the practice of the method of the invention, a wide variety of insulating sheets or substrates are employed. Typical of these are conventional roofing material such as foamed or cellular glass, fiber boards, rigid fiberglass mats, rigid expanded plastic foams such as those prepared from styrene polymers and copolymers, phenol formaldehyde resins, polyurethane compositions, and the like. Sheet members also satisfactory for the practice of the invention are sheets comprising concrete or similar cementatious material alone or in combination with other material such as plastic foam and the like. Sheet material is frequently supported by a deck such as sheet steel, plank, board or plywood or alternately, if the insulated member has sufficient strength, it is advantageously supported by rafters or similar supporting means.

The layer 16 advantageously is prepared from a roofing felt coated on one side which is to be laid adjacent the insulating panel with about 10 to 25 pounds per square of a low melting asphalt composition such as steep asphalt. Steep asphalts are particularly advantageous for practice of the present invention as the felt may be coated with the asphalt, the asphalt cooled, and felt lightly coated with particulate flake mica. The coated felt sheet is then stored as a roll until such time as it is to be used. Several varieties of suitable precoated sheets are available commercially. The slip coating, to prevent adhesion of the asphalt layer to the felt when the composite sheet is formed in a roll, should not be sufficiently heavy to prevent bonding of the asphalt layer to the insulated roof deck when heat is applied to the uppermost side of the coated felt. Generally, 10 to 25 pounds per square of asphalt or similar adhesive is sufficient to provide adequate bonding for conventional roofing applications. Insulating sheets such as open cell glass foams or plastic foams having a rough surface often will not bond readily to the felt if less than 10 pounds of asphalt are employed per square. However, in cases where the base insulating sheet is extruded, expanded plastic material having a relatively smooth skin, quantities as low as about 3 pounds per square are sufficient. For most roof installations, it is undesirable to go above a coating weight of about 25 pounds per square as the quantity of hot asphalt applied by conventional practice to the roofing felt is insufficient to raise the temperature of the heat activated adhesive layer to a bonding temperature. However, under certain conditions where heavy or thicker layers of felt are employed, it is sometimes desirable to use coating weights up to 50 pounds per square.

By way of further illustration, a plurality of experimental roofs were constructed employing as an insulating roof deck a plurality of different insulating base sheets. The following base sheets were employed: extruded polystyrene foam 1 inch in thickness, having a smooth surface, polystyrene foam 2 inches in thickness wherein the surface was severed cells, fiberboard ¾ of an inch thick, and a rigid board comprised of cemented glass fibers having a thickness of 1½ inches. On each of the above substrates there was applied a precoated web having the following specifications: rag felt having a weight of 15 pounds per square, coated with about 15 pounds per square of a steep asphalt melting at about 200° Fahrenheit, on the opposite side a coat of the same asphalt having a weight of about 2 pounds per square. The surface of the felt having the lighter coating weight was dusted with a coarse talc and supplied in rolls 36 inches wide and 70 feet long. A plurality of strips of the precoated felt with the side having the 15 pound asphalt coat toward the substrate were placed in overlapping relationship on the various insulating panels. A coat of hot asphalt was mopped onto the top of the surface of the precoated web and was immediately covered with a layer of 15 pound felt. A second layer of hot asphalt was applied and immediately covered with a second layer of 15 pound felt to make a 3 ply roof. A third hot coat of asphalt covered the final felt layer. Examination of the resultant roof sections indicated that the precoated felt adhered well to all sections and no thermal damage was observed to the polystyrene foam substrates. The followng table illustrates the tensile bond strengths of the precoated felt to the substrate in Table I.

*Table 1*

| Temperature | 1″ polystyrene foam | 2″ polystyrene foam | ¾″ Fiberboard | 1½″ Fiberglass |
|---|---|---|---|---|
| 0° F | 12 | 18 | 8 | 3 |
| 70° F | 13 | 17 | 9 | 2 |
| 120° F | 12 | 5 | 3 | 1 |

All value in p.s.i.

The foregoing tests were made by cutting an annular groove about 2¾ inches in diameter at right angles to the plane of the roof through the roofing coating into the substrate. A wooden block was adhered to the central portion of a generally cylindrical pillar bonded by the annular groove. A spring scale was attached to the wooden block. Tension, normal to the roof deck, was then applied to the spring scale until the pillar was pulled from the sheet. The tension required to dislodge a cylindrical block was noted and the tensile bond strength in pounds per square inch calculated. The values shown for the glass fiber panel are not representative, as the rotary cutter caused tearing and pulling of the fibers. The joints appearing between the bonds or planes of the various substrates were sound and the base sheet provided a moisture impermeable barrier which is in sharp contrast to roofing made up in accordance with the practice of the prior art wherein the precoated base sheet is not employed. By the practice of the invention a significant cost advantage is achieved.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method of preparing a roof structure which comprises applying alternate layers of a heat activatable adhesive material, and a flexible web over a sheet-like supporting member, the improvement which comprises providing a flexible web having at least one surface coated with a heat activatable adhesive, positioning said coated surface adjacent said supporting member, while said surface is below the temperature at which it would adhere to the supporting member, subsequently applying a hot fluid adhesive composition to the surface of said web opposite to said heat activated adhesive, said hot fluid adhesive composition having a sufficient quantity of heat to raise the temperatures of said web and said heat activatable fluid to a sufficient temperature to adhere said heat activatable adhesive to said supporting member.

2. The method of claim 1, wherein said heat activatable material is an asphalt.

3. The method of claim 2, wherein said heat activatable material is a steep asphalt having a melting point of about 200° Fahrenheit.

4. The method of claim 3, wherein said asphalt is coated on said flexible web to a thickness corresponding to a coating weight of from about 10 to about 25 pounds per square.

5. The method of claim 1, wherein said supporting member is comprised of expanded cellular polystyrene.

6. The method of claim 1, wherein said supporting member comprises foamed cellular glass.

7. A method of preparing a weather resistant surface on a roof deck comprising an exposed surface of expanded cellular polystyrene, comprising: applying to said roof deck a layer of flexible felt web, said web having on at least one side a coating of steep asphalt, placing the coated side of said asphalt coated web adjacent the expanded polystyrene roof deck, while said asphalt coated web is at a temperature below which the asphalt will adhere to the deck, subsequently applying to the surface of the flexible web remote from said polystyrene deck a coating of hot asphalt, said coating having a sufficient quantity of heat to raise the temperature of said felt and said asphalt coating to sufficient temperature to adhere said asphalt coating to the expanded polystyrene roof deck, adding a sufficient number of alternating layers of felt and asphalt to provide a desired thickness of roof.

References Cited by the Examiner

UNITED STATES PATENTS

| 53,281 | 3/66 | Duncan | 156—71 |
| 3,024,153 | 3/62 | Kennedy | 156—278 X |
| 3,094,447 | 6/63 | Chamberlain | 156—71 |

EARL M. BERGERT, *Primary Examiner.*

UNITED STATES PATENT OFFICE
CERTIFICATE OF CORRECTION

Patent No. 3,211,597                                October 12, 1965

James P. Sheahan

It is hereby certified that error appears in the above numbered patent requiring correction and that the said Letters Patent should read as corrected below.

Column 2, line 26, for "Overlying" read -- Overlaying --; column 4, line 49, strike out "web is at a temperature below which the asphalt will" and insert the same after "coated" in line 50, same column 4.

Signed and sealed this 26th day of July 1966.

SEAL)

Attest:

ERNEST W. SWIDER                                       EDWARD J. BRENNER
Attesting Officer                                              Commissioner of Patents